Oct. 25, 1932.  I. D. PERRY  1,884,833

DOOR BUMPER AND THE LIKE

Filed Sept. 16, 1931

Inventor:
Ira D. Perry
By Thos. Q. Dancup

Patented Oct. 25, 1932

1,884,833

UNITED STATES PATENT OFFICE

IRA D. PERRY, OF CHICAGO, ILLINOIS, ASSIGNOR TO EDNA L. MEYER, OF ROCKFORD, ILLINOIS

DOOR BUMPER AND THE LIKE

Application filed September 16, 1931. Serial No. 563,060.

This invention has to do with certain new and useful improvements in door bumpers and the like. The door bumper constructions herein disclosed are especially intended for use in connection with the doors of automobile bodies and the like, although it will appear that said features may also be used to advantage in connection with other constructions. Inasmuch, however, as said features have been devised especially with a view to meeting the requirements of automobile doors, I have illustrated and will particularly describe such uses and applications of the invention, but in so doing I wish it clearly understood that I do not thereby intend to limit myself except as I may do so in the claims.

In the construction of automobile bodies it is customary to provide a door frame member or element against or towards which the edge portion of the door moves during the door closing operation. Usually this element is in the form of what is known as a door pillar. The door pillar is generally so formed as to provide a ledge facing in the direction of door closing movement and also to provide inwardly extending flanges lying parallel to the direction of door closing movement. Generally said pillar is also provided with an outwardly extending flange which also lies parallel to the direction of door closing movement.

The companion edge portion of the door is so formed as to provide companion ledges and flange surfaces; the ledge of the door approaching directly towards the ledge of the door pillar, and the flanges of the door moving parallel to or wiping close to the flanges of the door pillar.

It is usually customary to provide one or more bumper blocks on the door pillar in position to receive the forces of pressure and impact incident to the door closing operation. Generally these bumper blocks on the door pillar are provided with head portions which are supported by the door pillar or some element thereon and the ledge of the door strikes or presses against the head portion of the bumper block when the door is closed. The bumper block is also usually provided with a lip or skirt portion which overlies the inwardly extending flange at the position of the bumper block and establishes a wiping contact surface against which the companion flange surface of the door wipes during the door closing movement.

The main object of the present invention is to provide a sheet metal door pillar construction together with a bumper block therefor, the arrangement being such that the outwardly extending flange of the door pillar is provided with an opening adjacent to the position of the ledge, the bumper block being provided with a lug or projection which engages the outwardly extending flange of the door pillar through said opening to thereby lock the bumper block in place on the door pillar. In some cases also the bumper block is provided with a lip or skirt which overlies a portion of the face of the inwardly extending flange of the door pillar; and in such case said inwardly extending flange may be provided with an opening which is engaged by an inwardly extending lug of the lip or skirt to secure the same in place.

Other objects and uses of the present invention will appear from a detailed description of the same which consists of the features of construction and combinations of parts hereinafter described and claimed.

Figure 3:
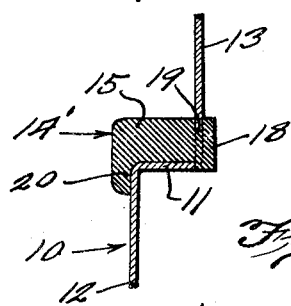
Figure 3 shows a fragmentary cross section through a modified form of door pillar embodying the features of the present invention and may be considered as a section on the line 3—3 of Figure 4 looking in the direction of the arrows.
Figure 4:
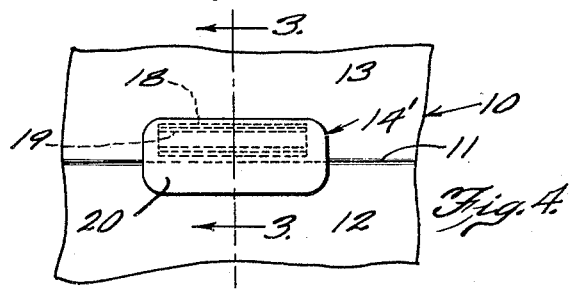
Figure 4 shows a plan view corresponding to the sectional view in Fig. 3 of the modified form of door pillar having applied hereto a modified door bumper.
Figure 5:
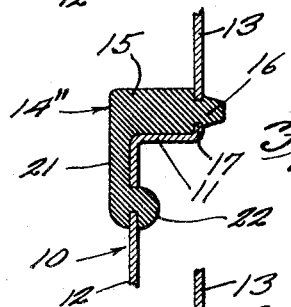
Figure 6:
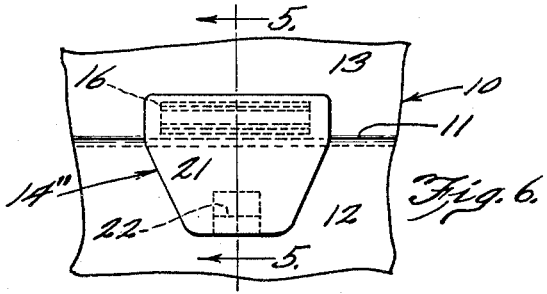
Figure 7:
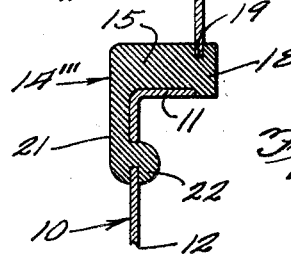
Figure 8:
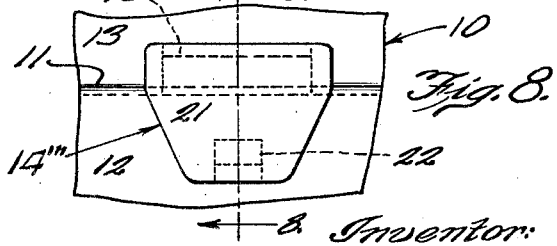

Figures 5 and 6 show views corresponding to Figures 3 and 4 but illustrating another modified form of construction; and Figures 7 and 8 show views similar to Figures 3 and 4 but illustrating still another modified form of construction.

This application is a continuation in part of my copending application, Serial No. 527,129, filed April 2, 1931.

In each case the door pillar 10 is shown as being provided with a ledge 11 facing in the direction of the door closing movement; and with inwardly and outwardly extending flanges 12 and 13 lying in the direction of door closing movement.

Figure 1:
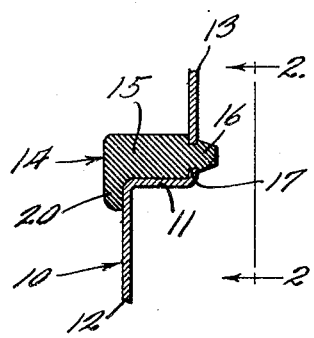
Figure 1 shows a fragmentary transverse section through a door pillar having applied thereto a bumper block embodying the features of the present invention and may be considered as a cross section on the line 1—1 of Figure 2 looking in the direction of the arrows.
Figure 2:
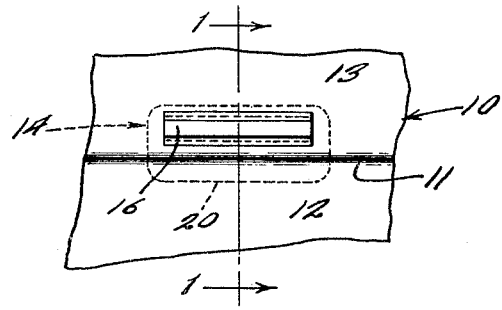
Figure 2 shows a back face view corresponding to Figure 1 looking in the direction of the arrows 2—2 of Figure 1.

In the arrangement shown in Figures 1 and 2 the bumper block 14 of resilient material is provided with a head 15 which rests upon and is directly supported by the ledge 11. The outwardly extending flange 13 is provided with an elongated opening 17 close to the position of the ledge 11, said opening being elongated in the direction parallel to the ledge. The head portion 15 of the bumper block is also provided with a lug or ear 16 which reaches through the opening 17 and is enlarged on its back side so that said lugs may be forced through said opening by subjecting it to compression, and when so forced through the opening it will expand on the back side of the flange and thereby lock the bumper block in place.

In the modified construction of Figures 3 and 4 the outwardly extending flange 13 is also provided with an opening 19, which in this case preferably extends down far enough to overlie the thickness of the metal of the ledge 11. In this case the lug 18 on the head portion of the bumper block can also be forced through the opening 19, and when so forced through said head will expand and overlie the opening 19 at both sides including the thickness of the ledge metal 11. This fact is clearly illustrated in Figure 3.

In each of the forms so far illustrated and described the head portion of the bumper block is also provided with a relatively narrow lip or skirt 20 which slightly overlies the inwardly extending flange 12 immediately adjacent to the position of the ledge 11.

The arrangement of Figures 5 and 6 is similar to that of Figures 1 and 2 and the arrangement of Figures 7 and 8 is similar to that of Figures 3 and 4. In each of the present cases however, the bumper block is provided with a relatively large lip or skirt 21 which extends down over the inwardly extending flange 12 a substantial distance; and said lip or skirt 21 is then provided with a hook shaped lug 22 which can be hooked through a properly positioned opening of the inwardly extending flange 12 so as to retain the lip or skirt in position thereagainst.

While I have herein shown and described only certain embodiments of the features of my present invention still I do not intend to limit myself thereto except as I may do so in the claims.

I claim:

1. A door buffer device comprising a pillar member having an impact ledge facing in the direction of door closing movement, and oppositely extending side flanges substantially parallel with the direction of door closing movement, the outwardly extending flange having an elongated opening provided therein lengthwise with respect to the ledge and adjacent the same, a bumper block extending across said ledge for abutment by the door in its closing movement, an elongated lip projecting inwardly from one longitudinal edge of the bumper block to overlie the side of the inwardly extending flange, and an elongated fastening lug extending lengthwise of the opposite longitudinal edge of the bumper block and fitting in the aforesaid opening so as to hold the bumper block in place on the impact ledge.

2. A device as set forth in claim 1 wherein the opening in the outwardly extending flange extends inwardly sufficiently so that the edge of the impact ledge defines one side of the opening and serves as a retaining shoulder for the bumper block, and wherein the fastening lug on the bumper block is formed to fit behind said shoulder.

3. A door buffer device comprising a pillar member having an impact ledge facing in the direction of door closing movement, and oppositely extending side flanges substantially parallel with the direction of door closing movement, the outwardly extending flange having an elongated opening provided therein lengthwise with respect to the ledge and adjacent the same, a bumper block extending across said ledge for abutment by the door in its closing movement, an elongated lip projecting inwardly from one longitudinal edge of the bumper block to overlie the side of the inwardly extending flange, an elongated fastening lug extending lengthwise of the opposite longitudinal edge of the bumper block and fitting in the aforesaid opening so as to anchor the block from one side thereof on said ledge, the inwardly extending flange also having an opening provided therein, and means on the aforesaid lip passing through said opening to anchor the block from its other side on said ledge.

4. A bumper for auto door pillars comprising a resilient block having angularly disposed sides, one of which is arranged to overlie the impact ledge of a pillar and has a single elongated fastening lug provided thereon in the form of an extension thereof, the other side being arranged to engage a wall of the pillar at right angles to the impact ledge.

5. A bumper for auto door pillars comprising a resilient block having angularly disposed sides, one of which is arranged to overlie the impact ledge of a pillar and has a single elongated fastening lug provided thereon in the form of an extension thereof, the other side being arranged to engage a wall of the pillar at right angles to the impact ledge and having another fastening lug provided thereon in a plane intermediate the ends of the first lug.

IRA D. PERRY.